March 3, 1964 C. WANTZ ETAL 3,123,296
THERMOSTATIC VALVE CONTROL
Filed Feb. 28, 1958 3 Sheets-Sheet 1

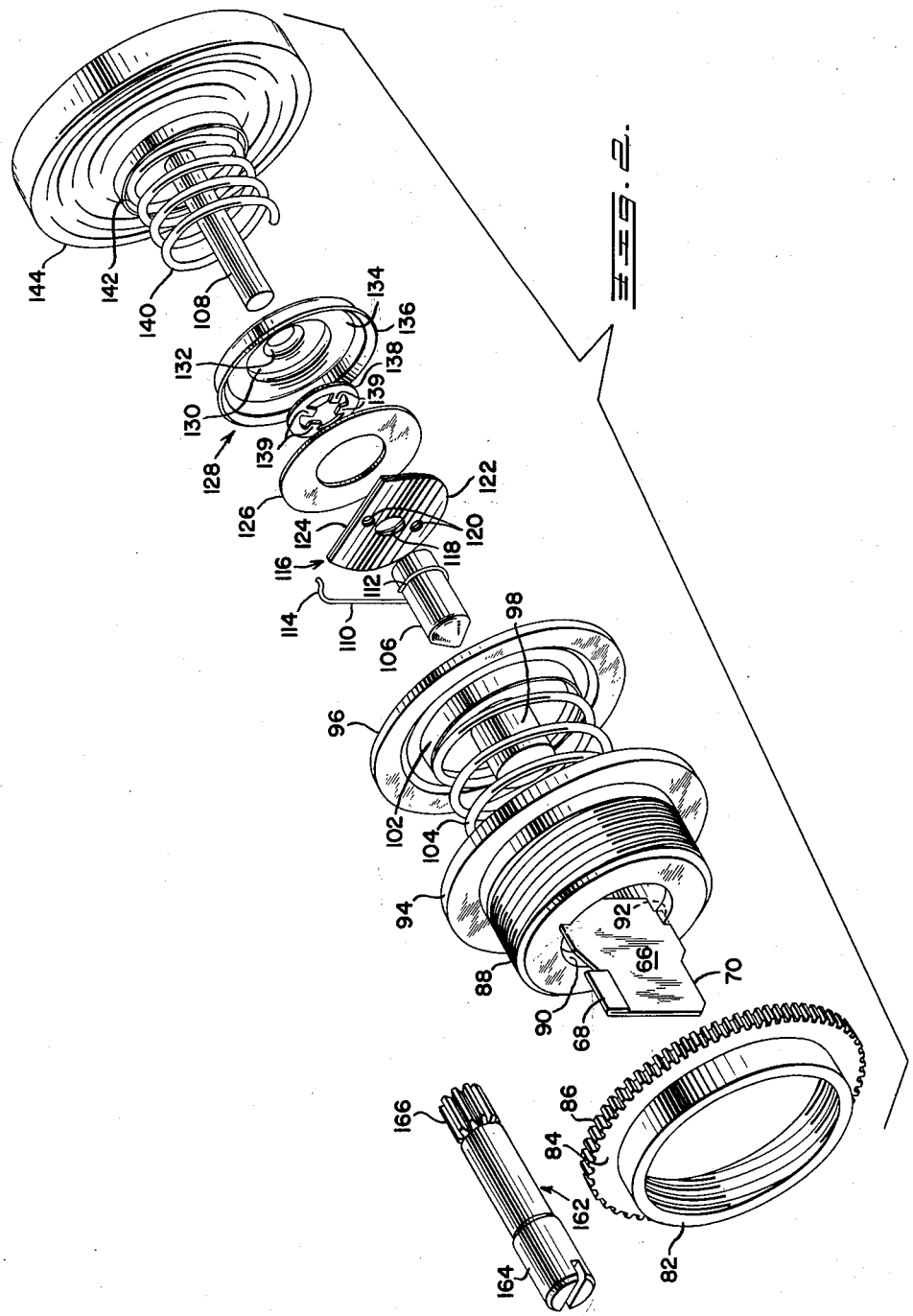

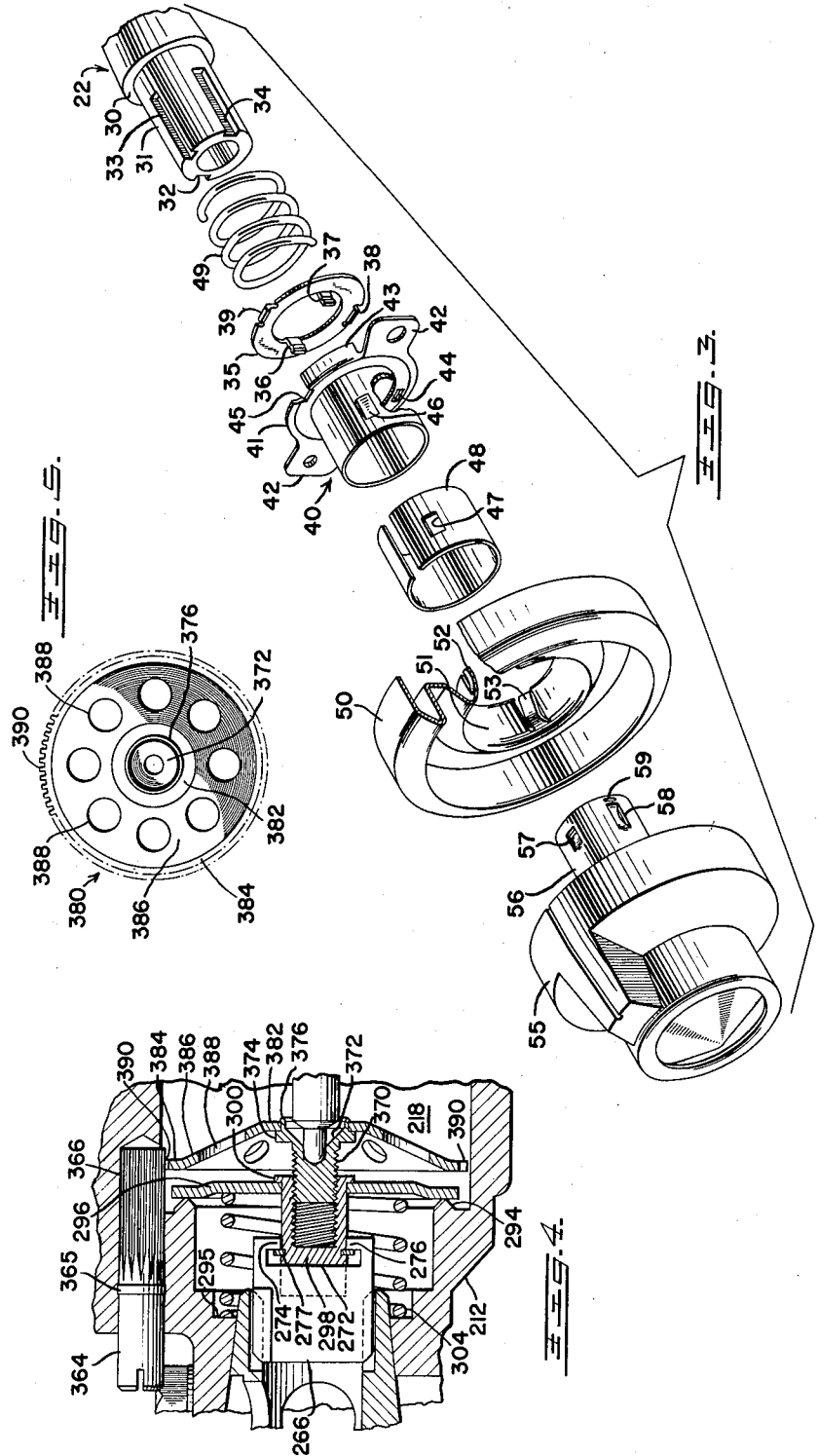

United States Patent Office 3,123,296
Patented Mar. 3, 1964

3,123,296
THERMOSTATIC VALVE CONTROL
Clarence Wantz and Roy C. Demi, Greensburg, Pa., assignors to Robertshaw Controls Company, a corporation of Delaware
Filed Feb. 28, 1958, Ser. No. 718,274
3 Claims. (Cl. 236—99)

This invention relates to flow control devices and more particularly to a combined gas cock and valve for controlling and regulating thermostatically a flow of gaseous fuel to a burner.

An object of this invention is to calibrate a thermostatic control device independently of its temperature setting means and its thermally responsive means.

Another object of this invention is to adjust the temperature setting of a thermostatic control device without disturbing the calibration setting.

A further object of this invention is to separate the calibration means of a thermostatic control device from the plug valve and the regulating valve of such device.

This invention has a further object in that actuation of a thermostatic control device is effected by movement of a valve seat assembly and calibration is effected by adjustment of the valve seat assembly independently of the actuating means.

This invention has a still further object in that the calibrating motion transmitting means is structurally separated from the regulating valve member and from the gas cock member of a thermostatic control device.

This invention is particularly applicable, although not limited, to the combination of a rotary shutoff cock and a reciprocating disc valve which is operable automatically by thermo-responsive means to maintain a predetermined temperature in an appliance such as the oven of a gas range. In the preferred construction, a valve seat assembly includes a first member in threaded engagement with a second member which is movable axially relative to a regulating valve member. A calibration screw extends through the front of the control housing into the valve chamber with a pinion fixed on its inner end for engagement with gear teeth provided on the periphery of the first member of the valve seat assembly. Rotation of the calibration screw causes rotation of the first member which, in turn, rotates the second member of the valve seat assembly causing axial movement thereof for calibration purposes.

Other objects and advantages will become apparent from the following description taken in connection with the accompanying drawings wherein:

FIG. 2 is an exploded perspective view of a portion of FIG. 1;

FIG. 3 is an exploded perspective view of another portion of FIG. 1;

FIG. 4 is a partial section view of a modification of this invention; and

FIG. 5 is a plan view of an element of FIG. 4.

Figure 1:
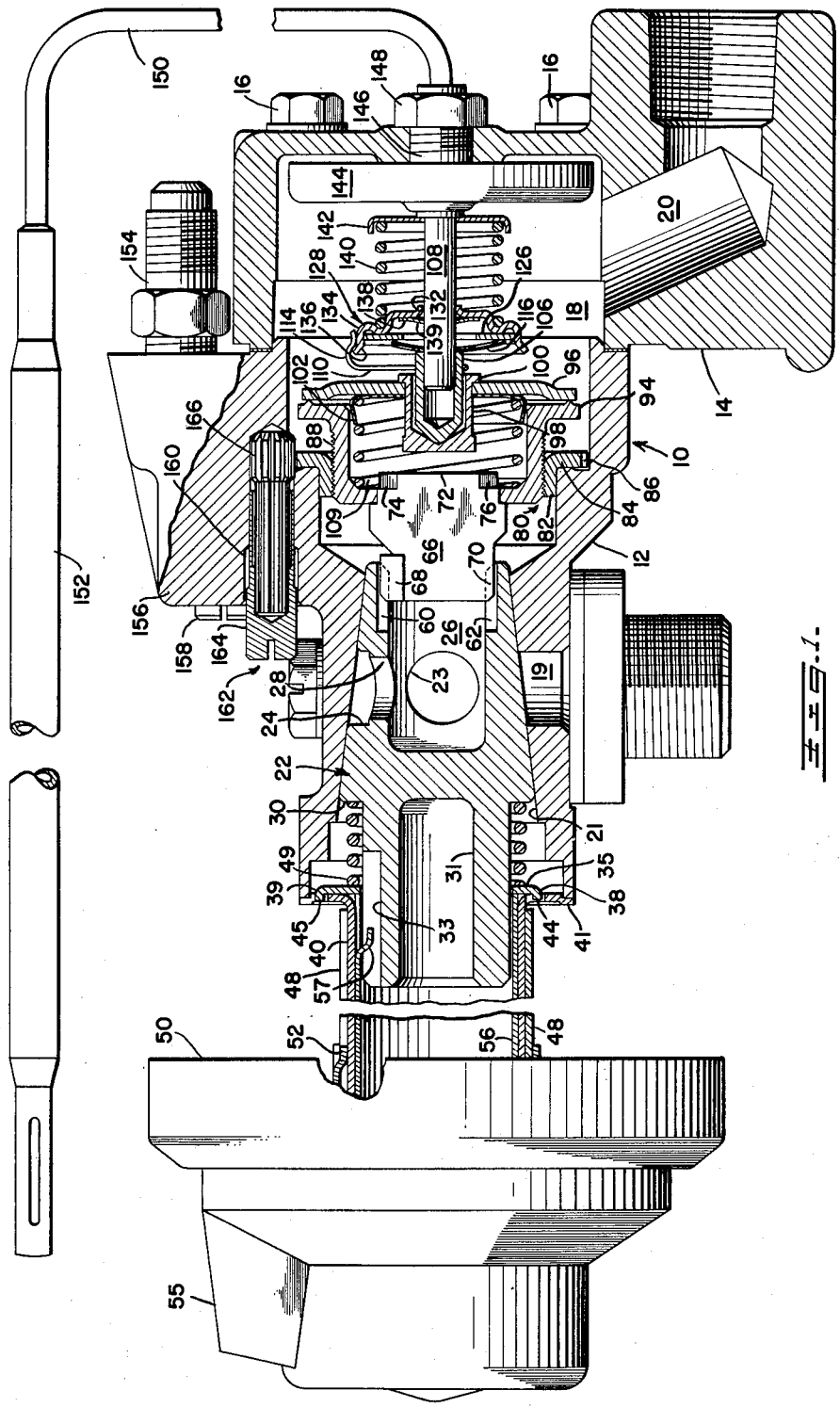
FIG. 1 is a side elevation view, partly in section, of a thermostatic valve control embodying this invention.

As is illustrated in FIG. 1, the thermostatic control device includes a housing, indicated generally at 10, having a front casing 12 and a rear casing 14 secured together by any suitable means, such as bolts 16. The interior of housing 10 is hollowed out to form a valve chamber 18 which establishes communication between an inlet port 19 in the front casing 12 and an outlet port 20 in the rear casing 14. The front casing 12 is opened at one end and provided with a frusto-conical bore forming a tapered valve seat 21 which intersects the inlet port 19 and communicates with the valve chamber 18. A generally hollow shutoff cock or valve member 22 has a corresponding tapered surface for cooperation with the tapered valve seat 21.

A pair of oppositely disposed ports 23 (only one being shown) in the hollow valve member 22 are connected by an arcuate groove 24 to permit a flow of gas from inlet 19 to an internal bore 26 of the valve member 22. An aperture 28 is provided in the side wall of the valve member 22 defined by the groove 24 midway between the ports 23 to facilitate the flow of gas in certain positions of the valve member 22.

Oppositely disposed to the hollow bore 26, the shutoff cock 22 is reduced on its outer periphery to form an annular flange 30 and a cylindrical stem 31 extending through the opening in housing 10. The outer portion of stem 31 is provided with three longitudinally extending slots 32, 33 and 34 radially spaced 90° from each other about the periphery of valve stem 31. A ring-type washer 35 is mounted on stem 31 and is provided with a pair of oppositely disposed tabs 36 and 37 on its inner periphery, which are received in the correspondingly disposed slots 32 and 34 in stem 31 for unitary rotation of the washer 35 and the valve stem 31. Ring washer 35 is also provided with another pair of perpendicularly bent lugs 38 and 39 located on its outer periphery and angularly displaced 90° from the inner peripheral tabs; the first lug 38 lies just inside the peripheral edge of ring washer 35 and the second lug 39 lies just outside of such peripheral edge.

A generally cylindrical cover 40 is open at both ends and an annular flange 41 on one end thereof is provided with a pair of oppositely disposed mounting ears 42 for securing the same to the front end of housing 10 by any suitable fastening means. An arcuate portion 43 of the annular flange 41 is bent perpendicularly for abutment by lug 39 to define the limits of rotation of the ring member 35 and the gas cock 22. The annular flange 41 is also provided with a pair of oppositely disposed rectangular openings 44 and 45 which respectively receive the lugs 38 and 39 of the ring washer 35. The cylindrical portion of cover 40 has a bent out section defining an aligning tab 46 which is received in a rectangular opening 47 in a split collar 48 for correctly positioning the collar 48 on the cover 40. A coil spring 49 surrounds the inner portion of stem 31 and is mounted in compression between the annular shoulder 30 of the gas cock 22 and the ring washer 35 whereby the lugs 38 and 39 are biased into the cover slots 44 and 45, respectively, to lock the gas cock 22 in its off position.

When the cover 40 is securely fastened to the housing 10, the coil spring 49, ring washer 35, and cover 40 are held in assembled relationship with the tabs 36 and 37 on the inner periphery of ring washer 35 extending inwardly of the cylindrical portion of cover 40. The split collar 48 is mounted on the exterior of the cylindrical portion of cover 40 and provides an aligning and mounting means for a generally annular bezel 50. A centrally apertured mounting portion 51 of bezel 50 is provided with an inwardly bent aligning lug 52 which is received in the space forming the split in collar 48 and an inwardly bent biasing lug 53 frictionally retains the bezel 50 in the correct axial position on the collar 48.

A control knob dial 55 having suitable temperature setting indicia which cooperate with a fixed index on the bezel 50 is secured to a cylindrical operating sleeve 56 which is slidably and rotatably mounted within the cylindrical portion of cover 40. Slightly spaced from its inner end, the dial sleeve 56 is provided with a longitudinally extending inwardly bent tang 57 intermediately spaced in angular relationship between a pair of rectangular detents 58 (only one being shown). Between the end of dial sleeve 56 and the edge of each rectangular detent 58, the dial sleeve 56 is dented inwardly to form a keeper 59.

For assembly purposes, the dial sleeve 56 is inserted through the cylindrical portion of cover 40 and its inner end encircles the outer portion of valve stem 31 in such a manner that its tang 57 is received in slot 33 and its rectangular detents 58 are received in slots 32 and 34. By depressing the dial 55 to its full extent, the keeper 59 will be forced under the tabs 36 and 37 to retain the dial 55 and sleeve 56 in assembled relationship with the gas cock 22. Because of the spacing of the tabs 36 and 37, the tang 57 and the detents 58 which interlock with the grooves 32, 33 and 34 in the valve stem 31, the washer 35 and dial 55 cannot be assembled incorrectly.

The gas cock 22 is provided adjacent its inner end with large and small slots, 60 and 62, oppositely disposed on its inner periphery which define the wall of hollow bore 26. A driving element 66 in the form of a flat rectangular plate has a reduced rear portion having large and small edges, 68 and 70, which are slidably mounted in the slots 60 and 62, respectively. The front end of drive plate 66 is provided with a reduced portion 72 with oppositely bent locking flanges 74 and 76 on its opposite edges.

A valve seat assembly, indicated generally at 80, is mounted in the valve chamber 18 and comprises a pair of relatively movable members. The first member is an internally threaded annular bushing 82 having an annular flange 84 with gear teeth 86 on its peripheral edge. The annular bushing 82 is sealingly mounted on an internal shoulder formed in the front casing wall which defines a part of the valve chamber 18; the bushing 82 can rotate on such internal shoulder but does not move axially. The second member is an externally threaded valve seat 88 which is threadedly mounted in the bushing 82. The valve seat 88 has a generally cup-shaped configuration with a central aperture 90 in its bottom wall which is formed with a pair of oppositely disposed slots 92 as is shown in dashed lines in FIG. 2. The front end of drive member 66 is received in the slots 92 (only one shown) and held therein by means of the bent flanges 74 and 76. On the end opposite its bottom wall, the valve seat 88 is provided with an outwardly extending radial flange 94, the front of which serves as an annular valve seating surface.

A reciprocating disc shaped valve member 96 is centrally apertured to be slidably mounted on a cup-shaped hub 98 which is outwardly flanged adjacent its open end to form an annular retainer 100 for the valve member 96. A spring retainer 102 is slidably mounted on the hub 98 contiguous to the side of valve member 96 which cooperates with the seating surface of the valve seat 88. A load spring 104 encircles the hub 98 and is mounted in compression between the bottom wall of the valve seat 88 and the retainer 102 so that the valve member 96 is always biased against the hub flange 100. A cup-shaped sleeve 106 is slidably received within the hub 98 and has its nose portion abutting the bottom wall of hub 98. The open end of cup-shaped sleeve 106 is adapted to receive the end of a power element shaft 108, as is illustrated in FIG. 1. A spring clip 110 is resiliently mounted on sleeve 106 by means of a looped portion 112 on one end and is provided with a perpendicularly disposed attaching finger 114 on its opposite end.

A bimetallic disc 116 has a central mounting aperture 118 located between a pair of apertures 120 which permit fluid circulation to both sides of the disc 116. The opposed outer portions of disc 116 are bent slightly from its central portion to form a pair of converging surfaces 122 and 124 on one side. The disc 116 is assembled on shaft 108 with its central portion abutting the edge defining the open end of sleeve 106. As is illustrated in FIG. 2, the surface 124 is formed on a peripheral chord of the disc 116 and thus presents a larger contacting surface than that of surface 122. The variation in the dimensions of the contacting surfaces 122 and 124 results in a triangular arrangement to assure equalization of forces transmitted through the disc 116.

A ring washer 126 having a relatively large central aperture is mounted on shaft 108 and is free from engagement therewith. The contacting surfaces 122 and 124 of the disc 116 engage the washer 126 to hold the latter in abutting relation with a generally dish-shaped guide member indicated generally at 128. The guide 128 has a centrally apertured bottom wall 130, the inner periphery of which is integrally formed with an annular shaft bearing 132. The outer periphery of bottom wall 130 is integrally formed with an everted annulus 134 having a generally S-shaped cross section (FIG. 1). The outer periphery of annulus 134 projects in a direction opposite to that of the bearing 132 and is formed with an outwardly extending annular flange 136. As is illustrated in FIG. 1, the clip finger 114 loops over the flange 136 in such a manner as to retain the sleeve 106 in assembled relationship on the shaft 108.

A locking piece in the form of a lock washer 138 has four inwardly projecting teeth 139, the inner periphery of which engages the shaft 108. The ring portion of lock piece 138 fits within the everted annulus 134 of guide 128 so that one of its sides is engageable with the bottom wall 130 of guide 128 and its opposite side is engageable with part of the ring portion of washer 126. The teeth 139 of lock washer 138 are bent toward the free end of the shaft 108 so that when assembled, the lock washer 138 is slidable from the left to the right on the shaft 108 as viewed in FIG. 1, but is prevented from moving from the right to the left on shaft 108.

The two washers 126 and 138 engage one side of the guide 128 and an overtravel coil spring 140 engages the opposite side. The coil spring 140 encircles the shaft 108 and is mounted in compression between the guide 128 and a retainer 142 which is secured to shaft 108 for movement therewith. The attaching end of shaft 108 is integrated with an expansion power element 144 which may be of any suitable type that is known in the art. The power element 144 is mounted on the rear of casing 14 by means of a threaded stud 146 and a lock nut 148. The stud 146 is provided with a central bore (not shown) one end of which communicates with the power element 144 and its other end receives the end of a capillary tube 150, which in turn is connected to a temperature sensing bulb 152 suitably positioned in a space to be temperature controlled.

The power element 144, the stud 146, the capillary tube 150, and the sensing bulb 152 constitute a closed system filled with an expansible fluid so that a variation of temperature sensed by the bulb 152 produces a corresponding expansion or contraction of the power element 144. A corresponding movement of the power element shaft 108 is effective to produce reciprocation of the valve member 96.

Adjacent the inner end of the gas cock 22, the front casing 12 is provided with a pair of small bores (not shown) one of which establishes a bypass passage to the outlet 20 for maintaining a minimum flow of fluid, the other of which establishes a pilot passage to maintain a flow of fluid to a pilot outlet connector 154. The connector 154 is threaded into the rear of a thickened portion 156 formed on the top of front casing 12. The front of the portion 156 has a pair of suitable bores to receive a pair of flow restrictors 158 (only one being shown) which separately intersect the bypass passage and the pilot passage for individual adjustment of the flow therethrough. Intermediate the bores for the flow restrictors 158, the thickened portion 156 is provided with a bore 160, the inner portion of which is reduced and communicates with the valve chamber 18. A calibration screw, indicated generally at 162, fits into the bore 160 and comprises an outer slotted member 164 having an internally grooved bore and an inner pinion member 166 having a splined shaft engaging the grooved bore for rotation by the outer member 164. The inner portion of the slotted member 164 frictionally fits within the reduced portion of bore 160 whereby the splined connection is frictionally biased to prevent any free rotation of the pinion 166. This frictional force is overcome by turning the slotted member 164 causing rotation of the pinion 166 which meshes with the gear teeth 156 on the peripheral edge of the bushing flange 84 and thus produces an adjustment of the valve seat assembly 80.

In order to place the thermostatic control device in operation, the dial 55 is moved inwardly so that the dial shaft 56 and washer 35 are depressed against the bias of coil spring 49 whereby the washer lugs 38 and 39 are disengaged from their respective slots 44 and 45. While in its depressed condition, the dial 55 is rotated counterclockwise and the washer lugs 38 and 39 bear against the cover flange 41. Since the initial rotation angularly spaces the washer lugs 38 and 39 from the slots 44 and 45, the dial 55 assumes a normal depressed condition and does not have to be so retained by the operator during additional rotation. Because of the radial offset between cooperating lugs and slots, further interlocking is precluded during additional counterclockwise rotation. If the dial is rotated to its highest temperature setting, the washer lug 39 will abut the edge of the arcuate portion 43 which defines the limit of counterclockwise rotation. The rotation of the dial 55 to a desired temperature setting causes rotation of the gas cock 22 by means of the lugs 57 and 58 so that one of the ports 23 registers with the inlet 19.

The rotary motion of the valve of the gas cock 22 is transmitted to the drive plate 66 which in turn rotates the threaded valve seat 88 relative to the threaded bushing 82. Because of this threaded connection and because the bushing 82 is held against rotation, the rotary motion of the drive plate 66 is converted to axial movement for the valve seat 88; thus, dial 55, dial sleeve 56, gas cock 22, and guide plate 66 rotate as a unit to constitute the actuating means for selectively positioning the valve seating surface 94 relative to the valve member 96.

When the temperature of the space being controlled reaches that for which the dial 55 has been set, the power element 144 will expand causing its power shaft 108, sleeve 106, spring clip 110, disc 116, washer 126, guide 128, washer 138, spring 140, and retainer 142 to move as a unit to the left as viewed in FIG. 1. It is apparent from the relative sizes and designs of the load spring 109 and the overtravel spring 140 as viewed in FIG. 1 that the overtravel spring 140 exerts a greater force than that of the load spring 109; thus, the hub 98 and the valve member 96 mounted thereon move as a unit with the above temperature responsive means against the bias of spring 109 until the valve member 96 engages the valve seating surface 94 to cut off the flow of fluid to the outlet 20. As is well known in the art, the bypass passage provides means to maintain a minimum flow of fluid to the outlet 20 while the regulating valve member 96 is closed against the valve seating surface 94 in response to thermostatic action.

In order that the thermostatically controlled device be responsive solely to the remote temperature sensed by the thermal sensing bulb 152, the bimetallic disc 116 is utilized to compensate for any movement of the power element 144 that is due to ambient temperatures in the vicinity of the housing 10. Because of the bias exerted on the rear face of guide 128, one side of the bimetallic disc 116 abuts the edge defining the opening end sleeve 106 while its other side firmly contacts washer 126 along its contacting surfaces 122 and 124. A rise in ambient temperatures causes the bimetallic disc 116 to flex about its central portion so that any movement caused by expansion of power element 144 in response to ambient temperatures is not transmitted to the sleeve 106.

When it is desired to turn off the thermostatic control device, the dial 55 is rotated clockwise to its off position. During such rotation, the coil spring 49 is biasing the washer lugs 38 and 39 against the cover flange 41 so that when dial 55 reaches its off position, the washer lugs 38 and 39 engage their respective slots 44 and 45 to lock the dial 55 in its off position. This clockwise rotation causes axial movement of the valve seat 88 in the threaded bushing 82 whereby the valve seating surface 94 engages the regulating valve member 96. Simultaneously, the gas cock 22 is rotated to a position where its tapered portion closes off the inlet 19.

During assembly of this thermostatic control device, automatic calibration may be accomplished on the production line as will become apparent from the following description. The threaded connection between the valve seat 88 and the bushing 32 is so designed that a given dial rotation matches the movement produced in the power element 144 by a given temperature change. Thus, the distance which the valve member 96 moves axially in response to thermostatic action is the same as the distance which the valve seat 88 moves axially in response to actuation of the dial 55. By fixing the position of the valve member 96 relative to the power shaft 108, the thermostatic control device may be calibrated at a given temperature.

The axial distance between the adjacent sides of the washers 126 and 138 as viewed in FIG. 1 is designed to correspond to the axial distance which the valve member 96 moves thermostatically when the dial 55 has been rotated to its highest temperature setting. Thus, one half of this axial distance corresponds to the axial distance traversed by the valve member 96 in response to thermostatic action when the dial 55 has been rotated to the midpoint of its control range. Since it is desired to calibrate the device at such mid-point, X distance is used for conveniently designating the travel of valve member 96.

In assembling this device, the drive plate 66, the valve seat 88 and the bushing 82 threaded thereon are held in the front casing 12 and pinion 166 is rotated by its slotted member 164 to locate the valve seat 88 in the position illustrated in FIG. 1, which is a predetermined distance from the rear of the front casing 12. All the elements 96 to 142 inclusive are assembled in their proper relation in the rear casing 14 and the locking piece 138 is initially located nearer the free end of shaft 108. The initial position of locking piece 138 differs from its position shown in FIG. 1 by a distance slightly greater than two times X distance, which represents the maximum travel of valve member 96 in response to thermostatic action when the dial 55 has been rotated to the upper limit of its control range. The casings 12 and 14 are now fastened together by means of the bolts 16 which upon tightening causes seating of the valve member 96 on the valve seat 88 and forces the hub 98, the sleeve 106, the disc 116, and the washer 126 along shaft 108 toward the power element 144. The washer 126 abuts the ring portion of locking piece 138 and forces it to move to the right on shaft 108 until the casings 12 and 14 are pulled tightly together by the bolts 16 at which point the contiguous surfaces of washers 126 and 138 are in contact.

Assuming that the mid-point of the control range for this device is 400° F., the sensing bulb 152 is placed in a 400° F. bath causing the power element to expand and move the power shaft 108 to the left a distance equal to the above described X distance. The valve member 96 is already seated so this expansion forces the shaft 108 through the locking washer 138 which is still in contact with the washer 126. At this point, the dial 55 without the interlocking washer 35 is temporarily assembled on the gas cock stem 31 in an off position. The dial 55 is now rotated clockwise by an amount which in angular degrees is equal to the linear X distance. Since the valve member 96 is seated on the valve seat 88, both are moved to the right by the dial rotation and the linear movement of valve member 96 is transmitted through hub 98, sleeve 106 and disc 116 to the washer 126 which is still in contact with washer 138 causing the same to move an X distance along the shaft 108 toward the right.

The dial 55 is now rotated counterclockwise to its off position so that valve seat 88, valve member 96, hub 98, sleeve 106, disc 116, washer 126 and guide 128 move to the left the X distance. Since locking washer 138 cannot move to the left, it will be in a position midway between the washer 126 and guide 128. The sensing bulb 152 is removed from the bath and allowed to cool so that the contraction of power element 144 causes the power shaft 108 to move to the right the X distance whereupon the locking washer 138 is brought into engagement with the bottom wall 130 of guide 128 as is shown in FIG. 1. The device is now calibrated at 400° F., and the dial 55 may be removed and subsequently assembled with its locking washer 35 in place.

In the event an excessive temperature is sensed by the bulb 152 after the valve member 96 is seated in response to thermostatic action, the additional expansion of power element 144 causes compression of overtravel spring 140 so as not to subject the regulating valve means to undue stress. During such overtravel operation, the locking piece 138 moves with the power shaft 108 which penetrates deeper into the sleeve 106. Subsequent contraction of the power element 144 returns the power shaft 108 to its original position so that the automatic calibration accomplished during assembly is undisturbed.

From the foregoing description, it is apparent that this control device includes regulating valve means having a valve seat and valve member relatively movable thereto, actuating means comprising a gas cock and dial assembly operably connected to the regulating valve means for actuating the same to a selected operable position, temperature responsive means also connected to the regulating valve means for operating the same in response to thermostatic action, and automatic calibration means. In addition, a second calibration feature is provided whereby the control device may be calibrated from the front after installation. To this extent, the calibration means includes motion transmitting means in the form of a gear and pinion and is connected to the regulating valve means for adjusting the same independently of the actuating means and the temperature responsive means.

Calibration may be accomplished after installation by turning the slotted member 164 to rotate the pinion 166 which meshes with the gear teeth 86 on the bushing 82 to rotate the same. Because of the threaded connection between bushing 82 and valve seat 88, the rotation of bushing 82 produces axial movement of the valve seat 88 to adjust the same for calibration purposes. With such an arrangement, the calibration means is readily accessible from the front of the control device and at the same time, is structurally separated from the actuating means and the thermally responsive means. By separating the means utilized for the selective positioning of the regulating valve means in a thermostatic control device from the means utilized for the calibrating operation, the gas cock 22 is operable independently of front calibration screw 162 so as not to disturb the calibration setting.

A modification of the regulating valve means and calibration means therefor is illustrated in FIGS. 4 and 5 wherein reference numerals with 200 added are utilized to designate similar parts which have been described above.

As is illustrated in FIG. 4, the drive member 266 has a forward edge 272 received in the slotted end of a cup-shaped hub member 298. The drive member 266 is fastened to hub member 298 by means of a pair of oppositely disposed inwardly extending flanges 274 and 276 which engage a split snap ring 277 disposed in an annular groove adjacent the end of hub 298. An annular retainer 300 is formed on the hub 298 adjacent the open end thereof to present an abutment for the reciprocating valve member 296 which is slidably mounted on hub 298.

A fixed valve seat 294 is integrally formed on an internal wall of casing 212 in the valve chamber 218 to cooperate with valve member 296. A load spring 304 encircles hub 298 and is mounted in compression between a recessed annular wall 295 and the valve member 296 to bias the same against the hub retainer 300. Because of the slotted connection, the drive plate 266 rotates the hub 298 to position the valve member 296 relative to the valve seat 294. To this extent, the hub 298 is threaded onto a stud 370 which has a recessed opened end 372 for receiving the nose portion of the temperature responsive means as described previously.

Adjacent its open end 372, the stud 370 is formed with an annular collar 374 and a bent over retainer 376 for fixedly mounting a dish-shaped calibrating disc 380 therebetween so that the stud 370 and disc 380 rotate as a unit. The disc 380 comprises an inner mounting portion 382 and an outer portion 384 connected thereto by an offsetting intermediate portion 386. A plurality of apertures 388 are radially spaced about the offsetting portion 386 to permit a flow of fluid through the disc 380 to the outlet. The periphery of outer portion 384 is formed with gear teeth 390 whereby the disc 380 may be rotated for calibration purposes.

A calibration screw comprises an outer slotted portion 364 and an inner splined portion 366 separated by a resilient sealing ring 365. The calibration screw is frictionally mounted in a suitable bore provided on the top of the front casing 212 in such a manner that the splined portion 366 meshes with the gear teeth 390 on the disc 380.

The actuation of the regulating valve means shown in FIG. 4 is similar to that previously described in connection with FIG. 1 except that the valve member 296 is moved axially by the drive member 266 which rotates the hub 298 on the threaded stud 370. Thermostatic cycling is effective to reciprocate the stud 370, the hub 298, the drive member 266, and the valve member 296 as a unit; during this reciprocation the calibrating disc 380 also reciprocates with such unit because its gear teeth 390 are axially slidable in the splines forming the splined portion 366 of the calibrating screw. The calibrating screw is turned to rotate the calibrating disc 380 which in turn adjusts the threaded connection between the hub 298 and the stud 370.

Inasmuch as this disclosure is subject to various changes in structural details and reversal of parts, it is intended that the foregoing description and drawings be interpreted as illustrative and not in a limiting sense.

We claim:

1. In a thermostatic control device, the combination comprising a housing having an inlet and an outlet, a valve seat in said housing, a valve member cooperable with said seat to regulate a flow of fluid to said outlet, means operatively connected to said valve seat for moving said valve seat into engagement with and away from said valve member, thermally responsive means operative for imparting regulatory movement to said valve member in response to temperature variations, said thermally responsive means including a shaft which moves in response to variations in the temperature sensed by said thermally responsive means, biasing means, a stop member movable on said shaft only in the direction away from said valve member, means coupling said stop member with said biasing means and said valve member whereby lost motion coupling is provided in response to normal operative movement of said valve member by said valve seat in a direction away from said valve seat so that the position of said stop member on said shaft remains unchanged while direct coupling is provided for movement of said valve member in response to the movement of said shaft.

2. In a thermostatic control device, the combination comprising a housing having an inlet and an outlet, a valve seat in said housing, a valve member cooperable with said seat to regulate a flow of fluid to said outlet, means operatively connected to said valve seat for moving said valve seat into engagement with and away from said valve member, thermally responsive means operative for imparting regulatory movement to said valve member in response to temperature variations, said thermally responsive means including a shaft which moves in response to variations in the temperature sensed by said thermally responsive means, means biasing said valve member toward said valve seat, a stop member movable on said shaft only in the direction away from said valve member, said stop member engaged by said biasing means whereby movement of said valve member toward said valve seat is controlled by said stop member and movement of said shaft, and means coupling said stop member and said valve member which is effective to alter the position of said stop member when said device is calibrated.

3. In a thermostatic control device, the combination comprising a housing having an inlet and an outlet, a valve seat in said housing, a valve member cooperable with said seat to regulate a flow of fluid to said outlet, means operatively connected to said valve seat for moving said valve seat into engagement with and away from said valve member, thermally responsive means operative for imparting regulatory movement to said valve member in response to temperature variations, said thermally responsive means including a shaft which moves in response to variations in the temperature sensed by said thermally responsive means, means biasing said valve member toward said valve seat, a stop member movable on said shaft only in the direction away from said valve member, said stop means operatively connected to said biasing means whereby movement of said valve member toward said valve seat is controlled by said stop member and movement of said shaft, and motion transmitting means coupling said stop member and said valve member following an initial movement of said valve member in a direction away from said valve seat, said stop member being moved to a calibration position on said shaft by said last-mentioned means by selective positioning of said valve member and operation of said thermally responsive means at a desired calibration temperature following assembly of said device in which said stop member is positioned so that said motion transmitting means provides a direct coupling between said valve member and said stop member to move said stop member along said shaft a distance corresponding to the movement of said valve member in a direction away from said seat and movement of said shaft toward said seat in response to said calibration temperature.

References Cited in the file of this patent

UNITED STATES PATENTS

| | | |
|---|---|---|
| 1,058,171 | Froehlick | Apr. 8, 1913 |
| 1,347,689 | Fitts | July 27, 1920 |
| 1,931,863 | Fonseca | Oct. 24, 1933 |
| 2,031,121 | Mueller | Feb. 18, 1936 |
| 2,066,821 | Brumbaugh | Jan. 5, 1937 |
| 2,141,614 | Mott | Dec. 27, 1938 |
| 2,190,276 | Smith | Feb. 13, 1940 |
| 2,539,106 | Schenck | Jan. 23, 1951 |

FOREIGN PATENTS

| | | |
|---|---|---|
| 432,909 | Great Britain | Aug. 5, 1935 |